C. P. BURT.
FISHING REEL.
APPLICATION FILED MAY 23, 1913.
1,095,807.
Patented May 5, 1914.
2 SHEETS—SHEET 2.
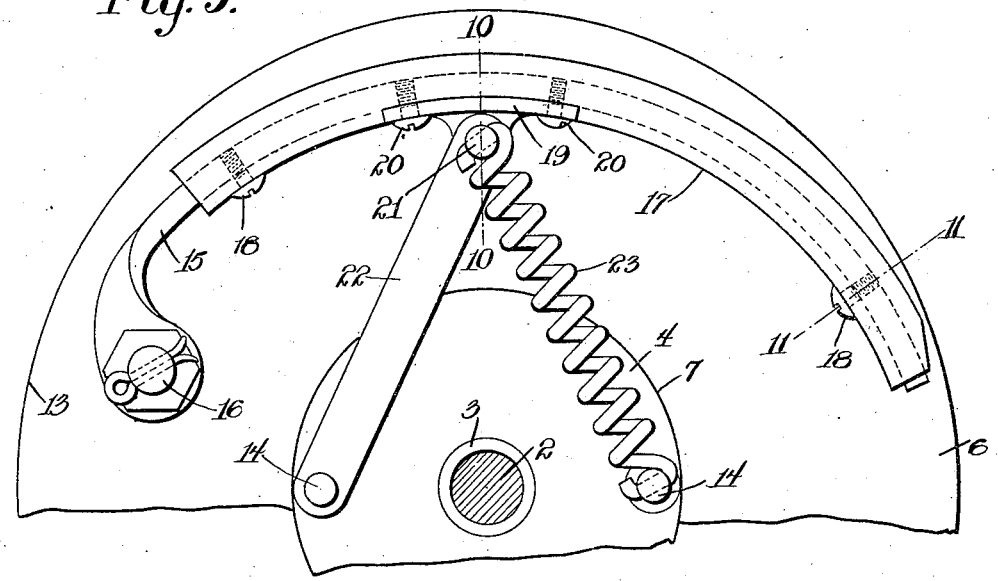
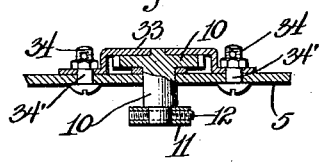
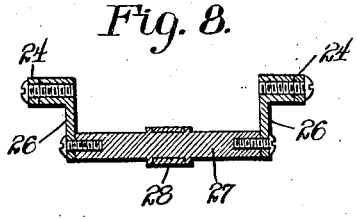
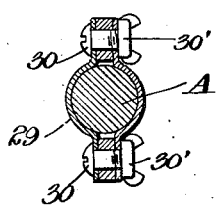
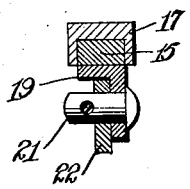
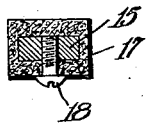
Inventor
Charles P. Burt
Witnesses
Wm H. Mulligan.
C. C. Hines.
By Victor J. Evans.
Attorney

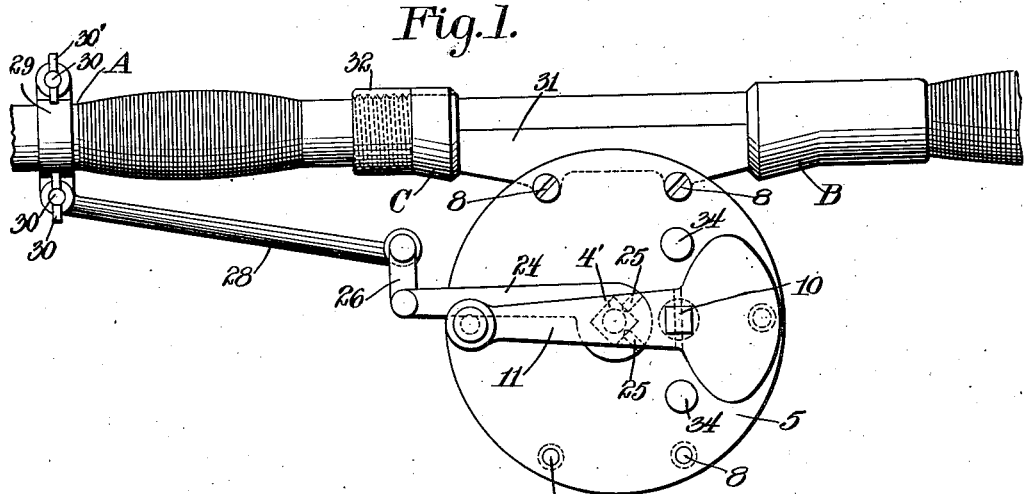
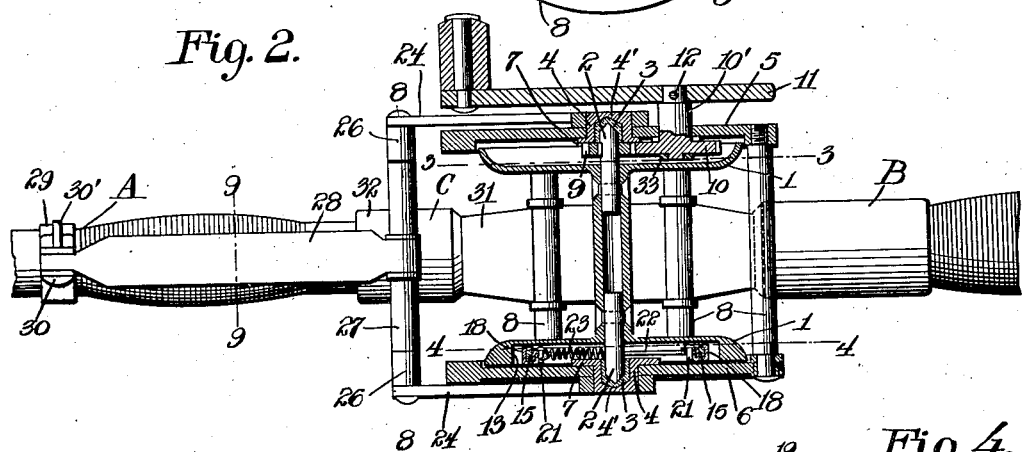
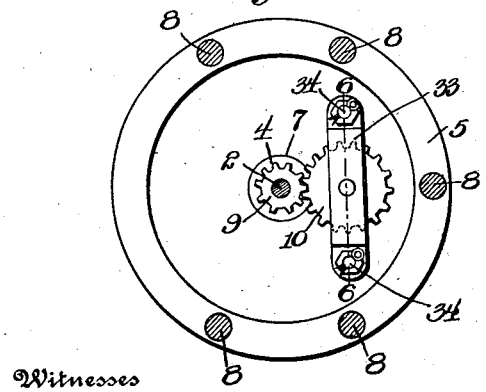

UNITED STATES PATENT OFFICE.

CHARLES P. BURT, OF ATLANTA, GEORGIA.

FISHING-REEL.

1,095,807.  Specification of Letters Patent.  Patented May 5, 1914.

Application filed May 23, 1913. Serial No. 769,467.

*To all whom it may concern:*

Be it known that I, CHARLES P. BURT, a citizen of the United States, residing at Inman Park, Atlanta, in the county of Fulton and State of Georgia, have invented new and useful Improvements in Fishing-Reels, of which the following is a specification.

My invention relates to improvements in fishing reels, and particularly to brake mechanism for controlling the rotation of the line drums of such reels, the object of the invention being to provide a brake mechanism of the expanding brake type which is simple of construction, reliable and efficient in action, adapted to be conveniently operated and regulated in action by the hand of the operator grasping the handle or grip portion of the rod, and which will act to quickly and positively control the speed of rotation of the drum without unduly checking or throwing objectionable shocks or strains upon the drum or upon the line.

The invention consists of the features of construction, combination and arrangement of parts hereinafter fully described and claimed, reference being had to the accompanying drawings, in which:—

Figure 1 is a side elevation of the handle portion of a fishing rod equipped with my improved reel. Fig. 2 is a horizontal transverse section through the reel. Figs. 3 and 4 are vertical longitudinal sections through the reel on the lines 3—3 and 4—4 of Fig. 2, looking respectively toward the inner faces of the head and tail plates. Fig. 5 is a view showing portions of the parts illustrated in Fig. 4 on an enlarged scale. Fig. 6 is a section on the line 6—6 of Fig. 3. Figs. 7, 8, 9, 10 and 11 are sections taken, respectively on the lines 7—7, 8—8, 9—9, 10—10, and 11—11 of Figs. 1, 2, and 5.

Referring to the drawings, 1 designates the drum of the reel, carrying hard steel journals 2, which run in agate bearings 3. The bearings 3 are recesses into bushings 4, carried by the head plate 5 and the tail plate 6. The bushings are provided with flanges 7, and are free to rotate in the head and tail plates. The head and tail plates are held rigidly parallel to each other by tie rods 8.

The drum is driven by spur gear wheels 9 and 10, the ratio preferably being 2 to 1. The wheel 9 is secured rigidly to the adjacent journal 2, while the wheel 10 is integral with its shaft 10'. The shaft 10' extends through the head plate and has a square shank on which the crank 11 is fitted, a screw pin 12 serving to secure the crank to the shaft.

The tail end of the drum has a cylindrical brake surface 13 turned on it. The bushing 4 in the tail plate carries two pins 14 set at diametrically opposite sides of its axis. Two flat steel springs 15 are secured to the tail plate by bolts 16, but are free to turn on the bolts. These springs are fitted with sleeves or brake shoes 17, which are held in position by screws 18. Bracket plates 19, provided with eyes 19', are secured to said springs by screws 20, and said eyes are fitted with pins 21. Links 22 and spiral springs 23 connect the pins in the bracket plates to the pins on the bushing as shown, the ends of the spiral springs being hooked through the holes in the pins to act as keepers for the links.

Outside the head and tail plates the bushings 4 have square shanks 4'. On these shanks are fitted brake arms 24, held by set screws 25. The outer ends of these arms are fitted with links 26, which links and arms are connected by a cross bar 27, thus forming an operating yoke coupled to the bushings. Attached to the middle of the cross bar, but free to turn on it, is a hand grip or lever 28. This grip or lever is pivotally secured at its outer end to the fishing rod A by a clamp or strap 29 provided with securing bolts 30 and wing nuts 30'.

Two of the tie rods carry the ordinary clip 31 with tapered ends, for attaching the reel to the rod. The ends of this clip engage the ferrules B and C on the rod. The ferrule C is backed by a ring 32, which may be screwed down on the ferrule to hold it firmly in place. A bridge 33 is arranged inside the head plate by bolts 34 having squared portions 34' engaging similar openings in the head plate to hold them from turning.

In use, the crank 11 is adapted to drive the drum 1 in either direction through the medium of the gears 9 and 10, the construction in this respect being similar to that of an ordinary reel. When the hand grip or lever 28 is moved toward the rod the brake arms 24 cause the bushings 4 to rotate in their bearings. The links 22 are thus actuated against the resistance of the springs 23 to force the springs 15 and brake shoes 17 out against the cylindrical brake surface 13, thus applying the brake. The brake members 15 and 17 are of less curvature (longer radius) than the brake surface on the drum, as a result of which the braking pressure is applied first at the free ends of the brake shoes, and consequently the area of the braking surface, and the braking pressure are increased gradually as the brake arms and the bushings are rotated by the hand grip or lever. When the pressure upon the hand grip or lever is reduced or removed the springs 23 retract the movable brake members, thus reducing the brake pressure or throwing said brake members out of action.

It will be observed that the construction described provides an expanding brake composed of a pair of oppositely disposed brake shoes adapted to be moved outward relatively or expanded to engage the brake surface 13, or to be moved inwardly or contracted to release their braking pressure. As the pressure of these brake shoes is yieldingly and gradually applied to the brake surface 13, it will be apparent that a quick application of the brake at any degree of pressure may be made without suddenly checking or straining the drum or line, since any sudden throwing of maximum brake pressure into action is avoided. In practice the reel is intended to be secured to the upper side of the rod, which is, for convenience of illustration, shown in reversed position in Fig. 1, and when used for the larger fishes the brake lever 28, arranged as shown, is employed, which lever is disposed in advance of the reel, and extends toward the tip of the rod. In fishing the butt of the rod is rested in a pocket secured to the fisherman's belt and the rod is held by the left hand at the forward grip, the fingers of the left hand being arranged to close over the brake lever and operate the brake, while the right hand is free to turn the crank handle or to steady the rod by grasping the rear grip. In fishing for game fish with smaller reels the yoke may be arranged to stand upright at right angles to the rod and a pull handle connected therewith and fitted to extend toward the butt of the rod. With this latter arrangement the rod may be held and the brake operated with one hand, a condition that is necessary in casting. I have not deemed it necessary to illustrate this modified form of the invention, as it and similar modifications will be apparent and fall within the scope and spirit of the appended claims.

I claim:

1. A reel including a frame structure, a drum journaled therein and provided with a cylindrical brake surface, an expanding brake comprising pivoted brake shoes curved on arcs with circumferential sections of greater radius than such surface and movable toward and from the same, a crank member, spring retracted links connecting said brake shoes with said crank member, and means for actuating said crank member.

2. A reel including a frame structure, a drum journaled therein and provided with a brake surface, an expanding brake comprising pivoted brake shoes movable toward and from the said brake surface, a crank member, spring retracted links connecting said brake shoes with said crank member, a yoke connected with the crank member for actuating the same, and an operating device for actuating the yoke.

3. A reel including a frame structure, a drum journaled therein and provided with a cylindrical brake surface, an expanding brake comprising yieldingly supported brake members movable into and out of engagement with said surface, a crank element, links coupling said crank element to said brake members, retracting springs connecting said brake members with said crank element, and controlling means for rotating the crank element.

4. A reel including a frame having a head and tail plates, a rotary crank element upon the tail plate, a drum journaled in said head and tail plates and provided with a cylindrical brake surface, an expanding brake composed of a pair of yielding brake shoes mounted upon the tail plate and movable toward and from said brake surface, actuating links connecting said brake shoes with the crank element, retracting springs connecting said brake shoes with the crank element, and means for rotating said crank element.

5. A reel including a frame structure having head and tail plates, a rotary crank element on the tail plate, a drum journaled in the head and tail plates and provided with a cylindrical brake surface, an expanding brake composed of a pair of curved yielding brake shoes mounted upon the tail plate and movable into and out of engagement with said surface, links connecting said brake shoes with said crank element, retracting springs connecting said brake shoes with said crank element, a yoke for actuating the crank element, and an operating member connected with the yoke.

In testimony whereof I affix my signature in presence of two witnesses.

CHARLES P. BURT.

Witnesses:
R. C. MACFALL,
MILTON D. HYATT.